United States Patent [19]

Fisher

[11] 4,233,102
[45] Nov. 11, 1980

[54] METHOD OF MAKING AN INFLATABLE FLOTATION DEVICE

[75] Inventor: John M. Fisher, Cuyahoga Falls, Ohio

[73] Assignee: The B. F. Goodrich Company, Akron, OhioIO

[21] Appl. No.: 962,520

[22] Filed: Nov. 20, 1978

[51] Int. Cl.² .................. B29H 7/03; B32B 31/20
[52] U.S. Cl. .................. 156/292; 5/449; 5/455; 9/11 A; 156/300; 156/313; 156/331; 156/338
[58] Field of Search .............. 156/289, 290, 291, 313, 156/251, 65, 292, 300, 306, 338, 331; 5/451, 449, 455; 9/11 A

[56] References Cited

U.S. PATENT DOCUMENTS

| | | | |
|---|---|---|---|
| 1,603,465 | 10/1926 | Hopkinson | 156/300 |
| 1,920,961 | 8/1933 | Anderson | 156/300 |
| 1,970,803 | 8/1934 | Johnson | 156/289 |
| 3,056,980 | 10/1962 | Holladay | 156/292 |
| 3,830,676 | 8/1974 | Elkins | 156/289 |
| 3,880,693 | 4/1975 | Urlings et al. | 156/334 X |

*Primary Examiner*—Michael G. Wityshyn
*Attorney, Agent, or Firm*—Harry F. Pepper, Jr.

[57] ABSTRACT

A method for making a multi-chambered flotation bag for helicopters or the like comprises forming two outer panels and at least one internal panel to substantially identical contour from flat/rubberized fabric sheet, forming at least two internal transverse wall members formed from flat rubberized fabric sheet, disposing adhesion strips for tapes along selected areas adjacent the peripheries of selected panels and wall members, and adhering the panels and wall members together to form the flotation bag structure.

2 Claims, 5 Drawing Figures

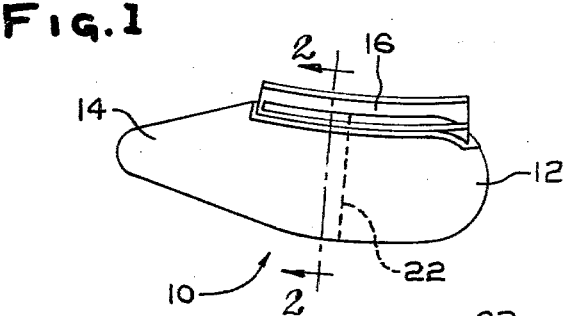
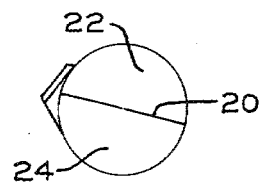
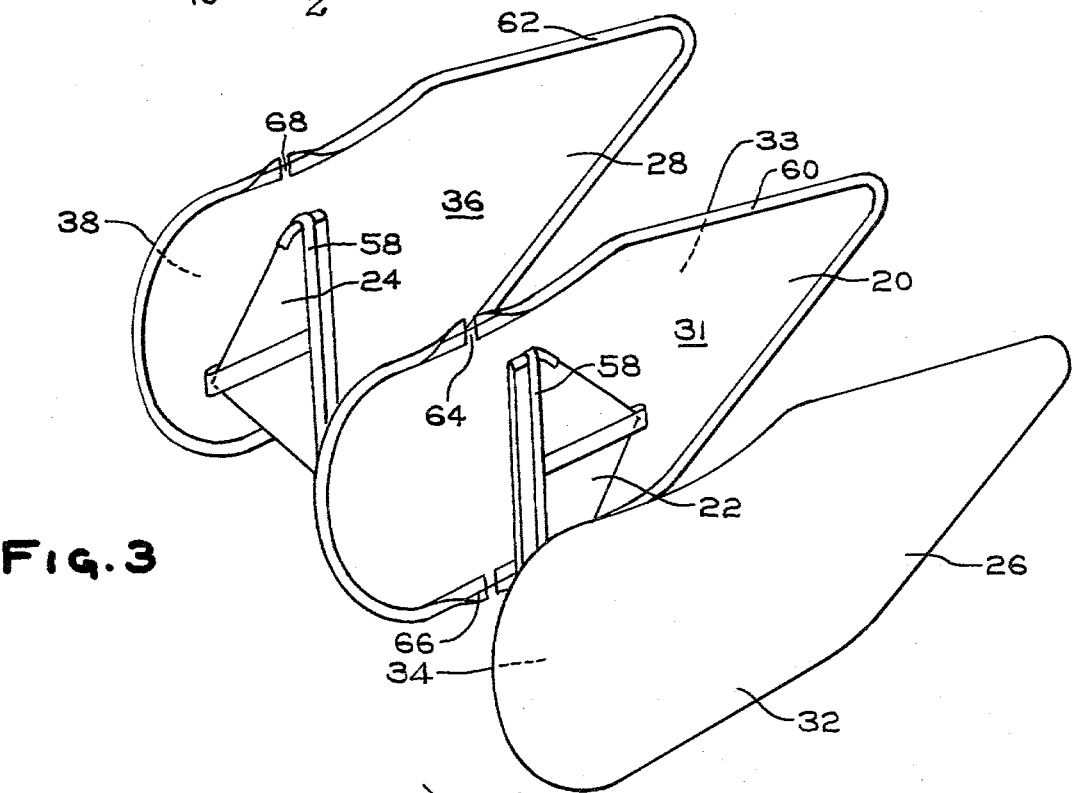
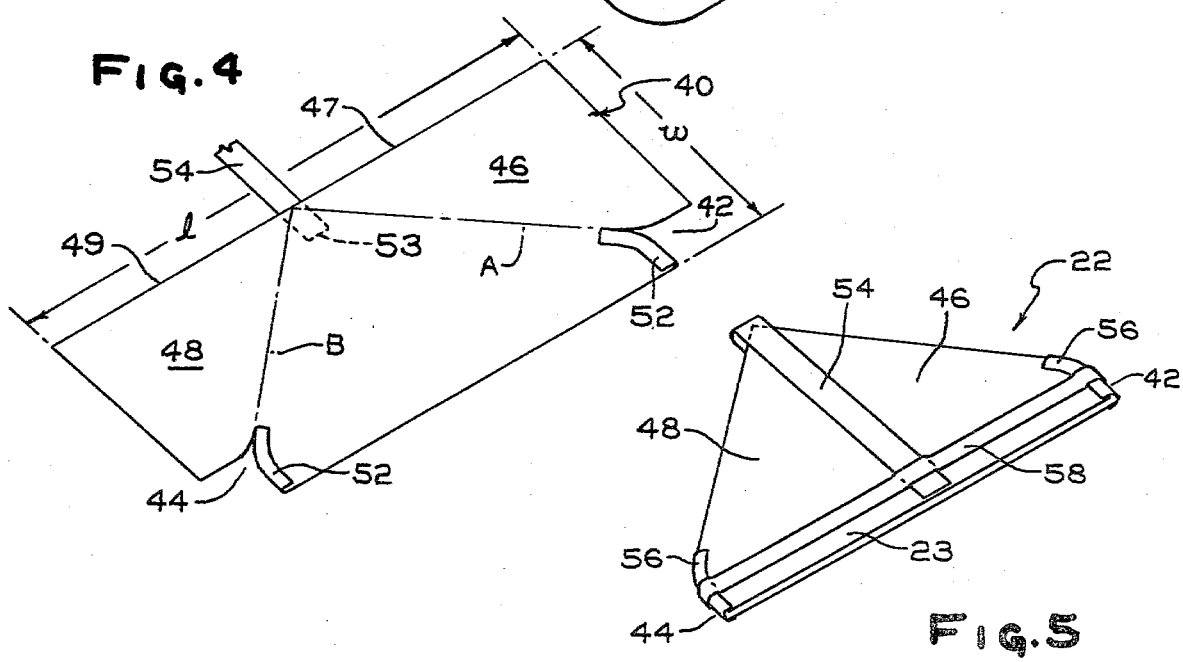

METHOD OF MAKING AN INFLATABLE FLOTATION DEVICE

BACKGROUND

The present invention relates to a multi-chambered inflatable bags and particularly to a method of making such bags.

Inflatable flotation bags, such as the type employed to maintain helicopters or the like afloat on water, are often characterized by a subdivided main inflation chamber. These subdivisions or subchambers are usually made fluidly independent of one another so that in the event of puncture or tear of the outer wall, only a single subchamber will deflate leaving remaining subchambers pressurized to maintain a sufficient buoyancy.

Depending upon the number of subchambers desired, multi-chambered flotation bags can comprise at least one air impervious longitudinal wall or bulkhead dividing the bag into two separate longitudinal subchambers. Such a structure is often formed by simply adhering a pair of inflatable tubes together along portions of the tube outer walls. The longitudinal subchambers can be further divided by disposing one or more walls across each of the longitudinal subchambers.

The fabrication of multi-chambered flotation bags can be difficult when considering that each subchamber is to be fluidly independent. The manner by which the chambers are subdivided and the means used to achieve subdivision sometimes results in a bulky internal structural design which prevents the bag from being easily handled for folding and packing. Also, if a flotation bag is fabricated by joining smaller subcomponent bags to effect a multi-chambered interior, the assembly operation is difficult and cumbersome sometimes requiring special equipment such as building forms or mandrels.

SUMMARY

The present invention is a simplified method of making a multi-chambered flotation bag wherein the basic components are formed easily from flat sheeting which components are joined in a flat manner, with the resulting inflatable structure adapted for easy compact packing for storage in a nondeployed condition. The method, in particular, comprises cutting or otherwise forming three substantially identically contoured panels from vulcanized rubberized fabric sheet, cutting transverse wall members to a specified pattern from vulcanized rubberized fabric sheet, folding said wall members upon themselves in a manner such that they are readily collapsible to a flat condition, and taping selected peripheral portions of the panels and wall members to each other to form the flotation bag.

THE DRAWINGS

In the drawings which illustrate the present invention in accordance with one preferred embodiment:

FIG. 1 is a plan view of an inflated flotation bag of a type finding utility with a helicopter;

FIG. 2 is an end view of a flotation bag taken along lines 2—2 of FIG. 1;

FIG. 3 is a perspective explosion-type view of a flotation bag such as that shown in FIGS. 1 and 2 made in accordance with the present invention;

FIG. 4 is a perspective view of a flotation bag component at a particular stage of its formation; and FIG. 5 is a perspective view of the flotation bag component shown in FIG. 4 at another stage of its formation.

DETAILED DESCRIPTION

The following describes the present invention as it applies to formation of a helicopter flotation bag, with the understanding that the invention is equally applicable to other types of inflatable emergency flotation bags.

In FIG. 1, a flotation bag 10 is shown having a shape particularly adapted to provide buoyancy to a helicopter, for use when a helicopter must float upon a body of water. The bag 10 would typically be used as part of a helicopter flotation system which might comprise four such bags, two on each side of the craft. The bag 10 as shown in FIG. 1 is generally longer than it is wide and is designed with spherically shaped, generally wider end 12 and a conically shaped, generally narrower end 14. When used on a helicopter having a pair of such bags on each side, end 14 will point forward of the craft if bag 10 is disposed as the fore bag of the pair, or will point rearwardly of the craft if the bag 10 is disposed as the aft bag of the pair. One side of the bag 10 is provided with an attachment flange 16 for securing the bag to the craft in the proper position. The bag 10 is held on the craft in a conveniently packed, uninflated condition (not shown) and when needed for flotation is inflated to the shape shown in FIG. 1 by the operator of the craft through an appropriate inflation system.

The interior of bag 10 as shown in FIGS. 1 and 2 is divided into four separate, fluidly independent subchambers. These subchambers are formed by a longitudinally extending sheet or bulkhead member 20 which seals the upper longitudinal half of the bag interior from the lower half and two transverse wall members 22 and 24 further subdividing each longitudinal half into a pair of subchambers sealed from each other. Preferably, transverse wall members 22 and 24 are positioned at locations in order that each of the four subchambers will be of substantially equal volume when the bag is fully inflated. It is understood that bag 10 could be divided into only two separate subchambers in which case only longitudinally extending sheet or bulkhead 20 would divide the interior of the bag. Also, it is understood that more than two transverse wall members could be used to further subdivide each longitudinal half so as to form a bag, such as 10, with more than four subchambers.

To describe the method according to the present invention, reference is made to FIGS. 3 through 5 where principal components of the bag assembly are shown.

The assembly is initiated by cutting or otherwise forming three flat panels 20, 26 and 28 from vulcanized rubber sheet material. Each panel is preferably cut to the same size and shape as that shown in FIG. 3. The sheet material is air impervious and comprises, for example, nylon or other fabric coated or impregnated with a suitable rubber such as neoprene, urethane or the like. It is understood that the term "vulcanized" includes processes known in the art by which such rubbers are cross-linked or cured. As seen, each flat panel 20, 26, and 28 is shaped to substantially conform to the desired bag contour.

Panel 26 as shown in FIG. 3 will constitute approximately half of the outer wall of the bag 10 and comprises an outer wall surface 32 and an opposite inner wall surface 34.

Panel 28 will constitute the other half of the outer wall of bag 10 and comprises an inner wall surface 36 and an outer wall surface 38.

Panel 20 for disposition between panels 26 and 28 will constitute longitudinal extending sheet 20 in FIG. 2 and comprises opposing surfaces 31 and 33.

Transverse wall members 22 and 24 are shown disposed between panels 26 and 20 and 28 and 20 respectively, and are formed by steps described with particular reference to FIGS. 4 and 5.

To form a transverse wall member such as 22, for example, a rectangular flat panel 40 of selected length 1 and width w is cut from vulcanized rubber sheet material similar to that used to form panels 20, 26, and 28. Small sections of material are cut from a pair of opposite longitudinal corners such as shown at 42 and 44, so as to allow folding of portions 46 and 48 of panel 40 along lines A and B extending from corners 42 and 44 to the midpoint of the opposite longitudinal edge of panel 40. Prior to folding of portions 42 and 44, rubber coated fabric strips or tapes 52 are positioned at an edge of each cutout corner 42 and 44. These tapes are preferably unvulcanized, where possible, to promote adhesion. Also, preferably, these tapes are further treated with a substance, such as a rubber cement, for still further adhesion properties. When folded, the strips 52 serve to hold the folds in place for further assembly steps. After folding portions 46 and 48 and adhering each to tapes 52, edges 47 and 49 will align in abutting relationship between the midpoints of the longitudinal edges of the panel 40. A rubber fabric tape 54 of material similar to tapes 52, with one end 55 disposed at the opposite surface of panel 40, is brought around and disposed along the abutting edges 47 and 49 to hold the same in place as shown in FIG. 5. Additional similar adhering tapes 56 are placed to further reinforce corners 42 and 44. A juncture tape 58 is then wrapped entirely around the lower margin 23 of wall member 22 as depicted in FIG. 5. Wall member 24 is formed in the same manner as just described for wall member 22.

As thus seen in FIG. 3, wall members 24 as formed by the steps described are shown in the appropriate positions wherein they will be adhered between panels 20, 26 and 28. As seen, each wall member 22 and 24 contain juncture tapes 58 wrapped around each of their outer edge margins.

The peripheries of two of the three panels 20, 26 and 28 are provided with continuous tapes 60 and 62 as shown in FIG. 3. It is preferred that tapes 60 and 62 are split and lifted away from the panels at four locations such as indicated at 64, 66 and 68, the fourth location not shown but understood to be opposite to location 68 on panel 28. These locations coincide with the transverse locations selected for disposition of wall members 22 and 24.

To assemble bag 10, wall member 22 can be pressed against panel 20 and adhered thereto by tape 58. The lifted portions of tape 60 at locations 64 and 66 can then be adhered over the corners of the wider margins of wall member 22. Wall member 24 can be pressed against panel 28 and adhered thereto in a manner similar to panel 22 is joined to panel 20.

Panels 20, 26 and 28 are then brought together and joined at their peripheries through the adhesion by tapes 60 to the inner surface periphery of panel 26 and adhesion of tape 62 to the periphery of surface 33 of panel 20. Also, juncture tape 58 on wall member 22 will adhere to inner surface 34 of panel 26, while juncture tape 58 will adhere to surface 33 of panel 20.

When assembled, the outer surface of the bag 10 will be characterized by a single continuous seam running longitudinally around the bag. This seam, if desired, can be further reinforced by a tape covering over the seam throughout its length on the outer surface of the bag 10.

It is understood that appropriate openings may be formed through panels 26 and 28 for inflation communication into each of the four subchambers of bag 10. These openings (not shown) can be formed when desired during assembly of the bag by the steps just described. Also, attachment flange 16 may be adhered at the appropriate location on the bag surface upon assembly of the components as described.

After assembly, the bag 10, which lies substantially flat, is placed in a heated cavity or the like to vulcanize the unvulcanized components during assembly.

When inflating bag 10, each subchamber is individually inflated and the outer wall panels 26 and 28 will expand to effect the desired bag shape of FIGS. 1 and 2. During inflation wall members 22 and 26 will open at their wider margins and seal each pair of chambers making up each interior longitudinal half of the bag defined by panel 20.

When deflating the bag 10, the transverse wall members 22 and 24 will reassume their shapes as illustrated in FIGS. 3 and 5, thereby resulting in a relatively flat structure which is easily packed for deployment storage.

Various modifications and departures are possible relative to the embodiment described by the foregoing, with such modifications and departures being understood as measured by the scope of the following claims.

I claim:

1. A method of making in inflatable emergency flotation bag having an inflation chamber divided into a plurality of fluidly independent subchambers, the method comprising the steps of:
   (A) forming a pair of similarly sized and contoured outer wall panels from vulcanized rubber coated fabric sheet;
   (B) forming an inner longitudinal wall panel of a size and contour similar to said outer wall panels from vulcanized rubber coated fabric sheet;
   (C) forming at least two similarly shaped transverse wall members from vulcanized rubber coated fabric sheet;
   (D) using unvulcanized rubber coated fabric tape to adhere selected peripheral portions of one of said at least two transverse wall members to the inner surface of one of the outer wall panels and a selected one of the opposite surfaces of said inner longitudinal wall panel;
   (E) using unvulcanized rubber coated fabric tape to adhere selected peripheral portions of the other of said at least two transverse wall members to the inner surface of the other of said outer wall panels and the surface of said inner longitudinal wall panel opposite said selected one of the opposite surfaces thereof; and
   (F) using unvulcanized fabric tape to join said panels to each other along their peripheral margins.

2. The method defined in claim 1 further comprising the step of
   (G) subjecting the assembly formed with steps (A) through (F) to heat to vulcanize said unvulcanized rubber of said tapes.

* * * * *